United States Patent
Sun et al.

(10) Patent No.: US 12,323,276 B1
(45) Date of Patent: Jun. 3, 2025

(54) REDRIVER CHIP, METHOD, AND DEVICE FOR ACTIVE COPPER CABLE

(71) Applicant: PHOTONIC TECHNOLOGIES (SHANGHAI) CO., LTD., Shanghai (CN)

(72) Inventors: Quanhui Sun, Shanghai (CN); Xuefeng Chen, Shanghai (CN); Kaitao Jin, Shanghai (CN); Pei Jiang, Shanghai (CN)

(73) Assignee: PHOTONIC TECHNOLOGIES (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/038,747

(22) Filed: Jan. 28, 2025

(30) Foreign Application Priority Data

Jul. 22, 2024 (CN) .......................... 202410977095.6

(51) Int. Cl.
 *H04L 25/03* (2006.01)
(52) U.S. Cl.
 CPC .............................. *H04L 25/03006* (2013.01)
(58) Field of Classification Search
 CPC ................................................ H04L 25/03006
 See application file for complete search history.

(56) References Cited

U.S. PATENT DOCUMENTS

| 8,867,668 | B2 * | 10/2014 | Beukema | .................. | H03F 1/02 330/136 |
| 2004/0251982 | A1 | 12/2004 | Gondi | | |
| 2008/0198913 | A1 | 8/2008 | Fan | | |
| 2020/0153395 | A1 * | 5/2020 | Geng | .................... | H03D 7/1458 |
| 2023/0281151 | A1 * | 9/2023 | Fujita | .................... | H04B 10/075 |
| 2025/0076958 | A1 * | 3/2025 | Gao | .......................... | G06F 1/32 |

FOREIGN PATENT DOCUMENTS

| CN | 1469607 | A | 1/2004 |
| CN | 108353044 | A | 7/2018 |
| CN | 212086233 | U | 12/2020 |

OTHER PUBLICATIONS

Chinese Office action filed in 202410977095.6 dated Aug. 26, 2024.
Chinese Notice of Allowance filed in 202410977095.6 dated Sep. 9, 2024.

* cited by examiner

*Primary Examiner* — Dac V Ha
(74) *Attorney, Agent, or Firm* — RANKIN, HILL & CLARK LLP

(57) ABSTRACT

A redriver chip for an active copper cable is provided includes: an input signal detection module, configured for detecting a signal amplitude of an input signal; an amplitude gain control module, configured for: performing amplitude control based on a first adjustable gain so as to obtain an intermediate signal; an equalization control module, configured for: performing gain control based on a second adjustable gain, to a gain of a high-frequency part of the intermediate signal relative to a low-frequency part, so as to obtain an output signal. The chip is configured for: amplifying in equal proportions a low-frequency part of the output signal relative to a low-frequency part of the input signal and a high-frequency part of the output signal relative to a high-frequency part of the input signal.

20 Claims, 5 Drawing Sheets

REDRIVER CHIP, METHOD, AND DEVICE FOR ACTIVE COPPER CABLE

CROSS-REFERENCE TO RELATED APPLICATIONS

The present application claims priority to Chinese patent application Ser. No. CN2024109770956, filed on Jul. 22, 2024, which has issued as CN118523794B on Oct. 22, 2024, the contents of which are incorporated by reference in their entirety.

FIELD OF THE INVENTION

The present disclosure relates to the field of signal transmission and signal processing technologies. More specifically, the present disclosure relates to techniques for the transmission system of measured values, control signals or similar signals and for devices affecting the relationship between input signals and output signals, in particular to redriver chip, methods, and device for active copper cable.

BACKGROUND OF THE INVENTION

In implementations such as high-performance servers and data centers, direct attach cables (DACs) are used for short-distance connections, such as short-distance cabling in cabinets. With the increase of data transmission rate and the increase of high-frequency attenuation in the signal transmission process, the direct copper cable connection technology faces problems such as shortening the connection distance and thickening the wire diameter, and finds it difficult to meet the needs of high bandwidth and high transmission rate. Active Copper Cable (ACC) uses external energy sources to enhance the signal transmission distance, such as using linear analog components in the data chain to compensate for the attenuation of medium and high frequency signals in the copper cable, reducing the complexity of module design. In conventional active copper cable schemes, the compensation of the high-frequency loss of the cable may lead to the reduction of the signal amplitude, and, in order to overcome the inter-symbol interference (ISI) caused by the high-frequency loss of the transmission channel, that is, the interference of the current symbol judgment caused by the insufficient transmission characteristics of the system, the de-emphasis processing is carried out at the transmitter end, the swing of the transmitted signal is compressed, and the swing of the received signal arriving at the receiver end is too small. Therefore, the eye height is small in the eye diagram test results, and the margin relative to the noise is insufficient.

In light of above, the application provides a redriver chip, a redriver method, and a device for active copper cables to cope with technical difficulties in the prior art.

SUMMARY OF THE INVENTION

In accordance with a first aspect of the present disclosure, a redriver chip for an active copper cable is provided. The redriver chip includes: an input signal detection module, configured for detecting a signal amplitude of an input signal, wherein the input signal is a differential voltage signal; an amplitude gain control module, configured for: performing amplitude control based on a first adjustable gain, to the signal amplitude of the input signal, in a first frequency range with reference to a first frequency, so as to obtain an intermediate signal corresponding to the input signal; an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency. The redriver chip is configured for: amplifying in equal proportions a low-frequency part of the output signal relative to a low-frequency part of the input signal and a high-frequency part of the output signal relative to a high-frequency part of the input signal.

With reference to the first aspect of the present disclosure, the redriver chip compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

In accordance with the first aspect of the present disclosure, in a manner of implementation, the second frequency range is from a lower limit of the first frequency range to the second frequency, and the first frequency is close to the lower limit of the first frequency range.

In accordance with the first aspect of the present disclosure, in a manner of implementation, the second frequency is determined based on a data transmission rate associated with the redriver chip.

In accordance with the first aspect of the present disclosure, in a manner of implementation, an upper limit of the second frequency range is not less than the second frequency, an upper limit of the first frequency range is at least twice the upper limit of the second frequency, and the equalization control module is used for providing high-frequency gain compensation in the second frequency range.

In accordance with the first aspect of the present disclosure, in a manner of implementation, the first frequency range is 0 GHz to 50 GHz, the second frequency is a certain frequency between 26.56 GHz and 28 GHz, and the data transmission rate associated with the redriver chip is 100 Gbps to 112 Gbps.

In accordance with the first aspect of the present disclosure, in a manner of implementation, a ratio of a signal amplitude of the output signal to the signal amplitude of the input signal is fixed, or the signal amplitude of the output signal is fixed.

In accordance with the first aspect of the present disclosure, in a manner of implementation, the redriver chip further includes: an output signal detection module, configured for detecting a signal amplitude of the output signal. The redriver chip is configured to operate in an automatic mode or a manual mode, when the redriver chip operates in the automatic mode, the signal amplitude of the output signal is fixed and independent of the amplitude of the input signal, and, when the redriver chip operates in the manual mode, a ratio of the signal amplitude of the output signal to the signal amplitude of the input signal is maintained at a preset value.

In accordance with the first aspect of the present disclosure, in a manner of implementation, the automatic mode is used for measuring an output gain of a pre-stage circuit relative to the redriver chip, and the manual mode is used for, dynamically adjusting an output gain of the redriver chip, such that the pre-stage circuit and the redriver chip together are, with respect to a post-stage circuit relative to the redriver chip, an equivalent circuit having a fixed output gain and a passive cable connection.

In accordance with the first aspect of the present disclosure, in a manner of implementation, the pre-stage circuit is a digital signal processing chip or a graphics processing unit, and the fixed output gain of the equivalent circuit is 1.0.

In accordance with the first aspect of the present disclosure, in a manner of implementation, when the output gain of the pre-stage circuit is 0.5, the output gain of the redriver chip is 2.0.

In accordance with the first aspect of the present disclosure, in a manner of implementation, the redriver chip is deployed at a transmitter end or a receiver end, or, two of the redriver chips are respectively deployed at the transmitter end and the receiver end.

In accordance with a second aspect of the present disclosure, a redriver method for an active copper cable is provided. The redriver method includes: by an input signal detection module of a redriver chip, detecting a signal amplitude of an input signal, wherein the input signal is a differential voltage signal; by an amplitude gain control module of the redriver chip, performing amplitude control based on a first adjustable gain, to the signal amplitude of the input signal, in a first frequency range with reference to a first frequency, so as to obtain an intermediate signal corresponding to the input signal; by an equalization control module of the redriver chip that is connected to the amplitude gain control module, performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency. The redriver chip is configured for: amplifying in equal proportions a low-frequency part of the output signal relative to a low-frequency part of the input signal and a high-frequency part of the output signal relative to a high-frequency part of the input signal.

With reference to the second aspect of the present disclosure, the redriver method compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

In accordance with the second aspect of the present disclosure, in a manner of implementation, an upper limit of the second frequency range is not less than the second frequency, an upper limit of the first frequency range is at least twice the upper limit of the second frequency, and the equalization control module is used for providing high-frequency gain compensation in the second frequency range.

In accordance with the second aspect of the present disclosure, in a manner of implementation, the redriver method further includes: by an output signal detection module of the redriver chip, detecting a signal amplitude of the output signal. The redriver chip is configured to operate in an automatic mode or a manual mode, when the redriver chip operates in the automatic mode, the signal amplitude of the output signal is fixed and independent of the amplitude of the input signal, and, when the redriver chip operates in the manual mode, a ratio of the signal amplitude of the output signal to the signal amplitude of the input signal is maintained at a preset value.

In accordance with the second aspect of the present disclosure, in a manner of implementation, the automatic mode is used for measuring an output gain of a pre-stage circuit relative to the redriver chip, and the manual mode is used for, dynamically adjusting an output gain of the redriver chip, such that the pre-stage circuit and the redriver chip together are, with respect to a post-stage circuit relative to the redriver chip, an equivalent circuit having a fixed output gain and a passive cable connection.

In accordance with a third aspect of the present disclosure, a device for active copper cable redriving is provided. The device includes: an input signal detection module, configured for detecting a signal amplitude of an input signal, wherein the input signal is a differential voltage signal; an amplitude gain control module, configured for: performing amplitude control based on a first adjustable gain, to the signal amplitude of the input signal, in a first frequency range with reference to a first frequency, so as to obtain an intermediate signal corresponding to the input signal; an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency; an output signal detection module, configured for detecting a signal amplitude of the output signal. The device is configured for: amplifying in equal proportions a low-frequency part of the output signal relative to a low-frequency part of the input signal and a high-frequency part of the output signal relative to a high-frequency part of the input signal.

With reference to the third aspect of the present disclosure, the device compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

In accordance with the third aspect of the present disclosure, in a manner of implementation, the first frequency is close to a lower limit of the first frequency range, the second frequency is determined based on a data transmission rate associated with the device, an upper limit of the second frequency range is not less than the second frequency, an upper limit of the first frequency range is at least twice the upper limit of the second frequency, and the equalization control module is used for providing high-frequency gain compensation in the second frequency range.

In accordance with the third aspect of the present disclosure, in a manner of implementation, the device is configured to operate in an automatic mode or a manual mode, when the device operates in the automatic mode, the signal amplitude of the output signal is fixed and independent of the amplitude of the input signal, and, when the device operates in the manual mode, a ratio of the signal amplitude of the output signal to the signal amplitude of the input signal is maintained at a preset value.

In accordance with the third aspect of the present disclosure, in a manner of implementation, the automatic mode is used for measuring an output gain of a pre-stage circuit relative to the device, and the manual mode is used for, dynamically adjusting an output gain of the device, such that the pre-stage circuit and the device together are, with respect to a post-stage circuit relative to the device, an equivalent circuit having a fixed output gain and a passive cable connection.

In accordance with the third aspect of the present disclosure, in a manner of implementation, the device is deployed at a transmitter end or a receiver end, or, two of the devices are respectively deployed at the transmitter end and the receiver end.

BRIEF DESCRIPTION OF THE DRAWINGS

The drawings are provided to illustrate example embodiments described herein and are not intended to limit the scope of the present disclosure.

DETAILED DESCRIPTION

Aspects and embodiments of the present invention will now be discussed with reference to the accompanying figures. Further aspects and embodiments will be apparent to those skilled in the art. All documents mentioned in this text are incorporated herein by reference.

It should be understood that in the description of the present disclosure, "at least one" means one or more and "many" means two or more than two. In addition, the terms "first", "second", etc., unless otherwise indicated, are used only for the purpose of distinguishing descriptions and cannot be construed as indicating or implying relative importance, nor as indicating or implying order.

Figure 1:
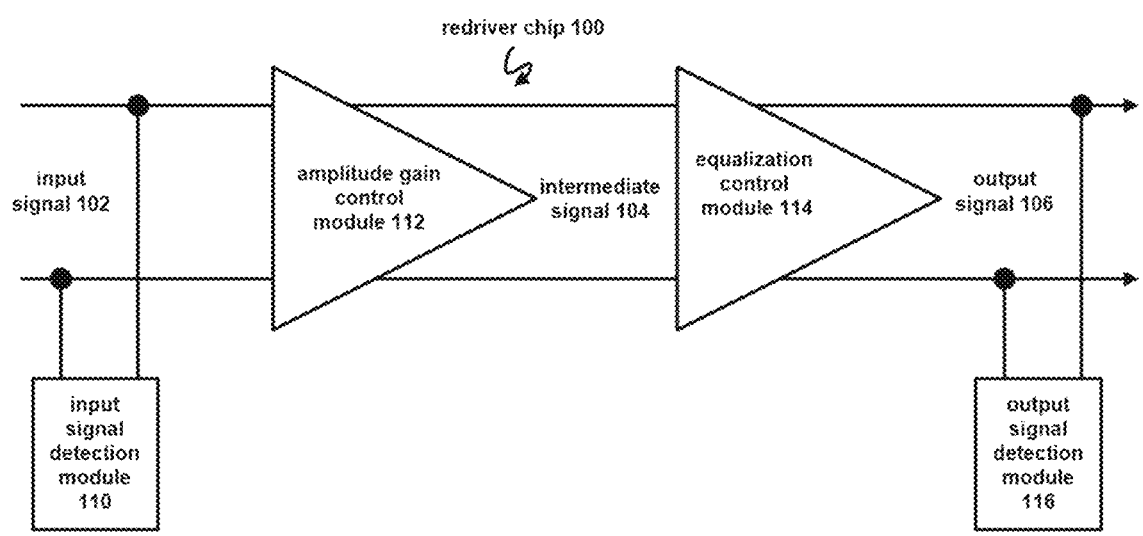
FIG. 1 is a schematic diagram of an example redriver chip for active copper cable according to some embodiments.

FIG. 1 is a schematic diagram of an example redriver chip for active copper cable according to some embodiments. As shown in FIG. 1, the redriver chip 100 includes: an input signal detection module 110, configured for detecting a signal amplitude of an input signal 102, the input signal 102 is a differential voltage signal; an amplitude gain control module 112, configured for: performing amplitude control based on a first adjustable gain, to the signal amplitude of the input signal 102, in a first frequency range with reference to a first frequency, so as to obtain an intermediate signal 104 corresponding to the input signal 102; an equalization control module 114, connected to the amplitude gain control module 112, configured for: performing gain control based on a second adjustable gain, to a gain of a high-frequency part of the intermediate signal 104 relative to a low-frequency part of the intermediate signal 104, in a second frequency range with a second frequency as an equalization frequency point, so as to obtain an output signal 106 corresponding to the input signal 102. The redriver chip 100 is configured for: amplifying in equal proportions a low-frequency part of the output signal 106 relative to a low-frequency part of the input signal 102 and a high-frequency part of the output signal 106 relative to a high-frequency part of the input signal 102.

The redriver chip 100 of FIG. 1, may be applied in implementations such as high-performance servers and data centers. In these implementations, direct attach cables (DACs) that are used for short-distance connections find it difficult to meet the needs of high bandwidth and high transmission rate, and Active Copper Cable (ACC) scheme is generally adopted to enhance signal transmission distance and meet the needs of high bandwidth. With the increase of data transmission rate, high-frequency attenuation in the signal transmission process is increased, for example, the signal sent from the Feed Forward Equalizer (FFE) at the transmitter end (TX) reaches the receiver end (RX) after a high-frequency signal attenuation of 30 decibel (dB) to 40 dB, and then may have to go through another attenuation of about 10 dB before it is received by the Decision Feedback Equalizer (DFE) at the receiver end, therefore, ACC scheme needs to compensate for the attenuation of medium and high frequency signals in the copper cable. In addition, the overall performance of the transmission channel may be affected by various factors, such as inter-symbol interference (ISI) and noise interference. For example, the de-emphasis processing performed by the digital signal processing (DSP) chip at the transmitter end will compress the swing of the transmitted signal, which may lead to the swing of the received signal reaching the receiver end being too small, which will also lead to a small eye height in the eye diagram analysis results and insufficient margin relative to the noise. In order for compensating for the high-frequency loss while also amplifying the swing amplitude of signal, one needs to take into considerations how to adapt to various situations of pre-stage circuits and post-stage circuits having characteristics of complex and changeable in application scenarios, and also needs to take into considerations the influence on the channel frequency response and eye diagram analysis results, also, needs to take into considerations adaptability under different frequencies, different communication protocols, and, different data transmission rates, so as to improve the overall transmission performance. With reference to FIG. 1, the following description illustrates how the redriver chip, methods, and device for active copper cable according to detailed embodiments of the present disclosure, compensates for the high-frequency loss while also amplifies the swing amplitude of signal, and flexibly adapts to the needs of complex application scenarios and the customized needs of users.

Referring to FIG. 1, an input signal detection module 110 is configured for detecting the signal amplitude of the input signal 102. The input signal 102 is a differential voltage signal. In FIG. 1, a pair of differential signal lines are used to represent that the output signal 106 is obtained after the input signal 102 passes through the redriver chip 100. The input signal detection module 110 detects the signal amplitude of the input signal 102 on the differential signal lines, and provides the operating basis for the other modules of the redriver chip 100. The input signal detection module 110 may include necessary sampling circuit, analog circuit elements in order to detect the signal amplitude of the input signal 102 in real time. The amplitude gain control module 112 is configured for: performing amplitude control based on a first adjustable gain, to the signal amplitude of the input signal 102, so as to obtain an intermediate signal 104 corresponding to the input signal 102. Therefore, the input signal 102 first goes through signal processing of the amplitude gain control module 112, that is, performing amplitude control based on the first adjustable gain to the signal amplitude of the input signal 102, so as to obtain the intermediate signal 104. The equalization control module 114 is configured for: performing gain control based on the second adjustable gain, to a gain of the high-frequency part of the intermediate signal 104 relative to the low-frequency part of the intermediate signal 104, so as to obtain the output signal 106 corresponding to the input signal 102. Therefore, the input signal 102 first goes through signal processing of the amplitude gain control module 112 to obtain the intermediate signal 104, and then, the intermediate signal 104 then goes through signal processing of the equalization control module 114, that is, performing gain control based on the second adjustable gain to a gain of the high-frequency part of the intermediate signal 104 relative to the low-frequency part of the intermediate signal 104, so as to obtain the output signal 106. Accordingly, the redriver chip 100 of FIG. 1 implements the signal processing for the input signal 102 in two stages sequentially, the first stage is the amplitude gain control module 112 performs amplitude control based on the first adjustable gain, and, the second stage is the equalization control module 114 performs gain control based on the second adjustable gain. The redriver chip 100 internally includes a signal processing scheme of the two stages that are implemented sequentially, that is, arranging the input signal 102 to first go through the signal processing of the amplitude gain control module 112 and then go through the signal processing of the equalization control module 114, and such a design means that, the amplitude control can be carried out first in order to realize the amplitude amplification in the system bandwidth range, such that this helps to indirectly ensure that the lifting amplitude of all frequency components in the system bandwidth range is consistent, and then the gain control is carried out. By performing equalization control to the gain of the high-frequency part relative to the low-frequency part, it is helpful to achieve amplifying in equal proportions from the low-frequency part to the high-frequency part, and also achieves uniformly lifting in the system bandwidth, which is ultimately conducive to making the eye diagram analysis results have a larger receiving eye height and improving the overall transmission performance. By using the amplitude gain control module 112 and the equalization control module 114 to perform amplitude control and equalization control respectively, this is also conducive to simplifying the overall design complexity, and is conducive to flexibly adapting to the needs of complex application scenarios and the customized needs of users. The amplitude gain control module 112 is designed to provide signal amplitude lifting over a wide bandwidth range, e.g. from 0 GHz (Giga Hertz, GHz) to 50 GHz, therefore, the amplitude control provided by the amplitude gain control module 112 sets a frequency reference point for performing amplitude lifting, and this frequency reference point is used as the starting point to lift up all frequency components in the system bandwidth range, which helps to indirectly ensure that the lifting amplitude of all frequency components in the system bandwidth range is consistent. In some embodiments, the amplitude gain control module 112 may provide amplitude amplification at lower frequencies close to direct current (DC), so that a lower frequency reference point is set. Then, the equalization control module 114 is designed to perform gain control on the output of the amplitude gain control module 112 which is the intermediate signal 104, that is, performing gain control based on the second adjustable gain to a gain of the high-frequency part of the intermediate signal 104 relative to the low-frequency part of the intermediate signal 104. Therefore, on the basis of the amplitude control provided by the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole. Moreover, the equalization control module 114 can, by presetting the equalization frequency point of high frequency, adapt to the specific data transmission rate. As described above, the amplitude gain control module 112 is designed to provide signal amplitude lifting over a wide bandwidth range, and therefore, the amplitude gain control module 112 sets a lower frequency reference point as a reference for performing amplitude lifting, in this way, depending on the specific data transmission rate, by presetting the equalization frequency point of high frequency, the gain control provided by the equalization control module 114 can be adapted to the specific data transmission rate, while achieving better performance in the channel frequency response and eye diagram analysis results. For example, the amplitude gain control module 112 provides a wide range of signal amplitude lifting, from 0 GHz to 50 GHz, and the data transmission rate of the ethernet is from 100 Gigabyte per Second (Gbps) to 112 Gbps, and the corresponding equalization frequency point can be preset for several specific data transmission rates, such as the equalization frequency point corresponding to the data transmission rate of 112 Gbps is 28 GHz. Accordingly, on the basis of the signal amplitude lifting over a wide range of system bandwidth (from 0 GHz to 50 GHz) provided by the amplitude gain control module 112, the gain control provided by the equalization control module 114, with the equalization frequency point that is preset, such as an equalization frequency point between 26.56 GHz and 28 GHz, can be adapted to a specific data transmission rate (from 100 Gbps to 112 Gbps). As such, the gain control provided by the equalization control module 114 is to control the gain of the high-frequency part relative to the low-frequency part on the basis of the equalization frequency point that is preset, and the equalization frequency point is determined based on the data transmission rate associated with the application scenarios of the active copper cable, for example, the equalization frequency point corresponding to the data transmission rate of the ethernet of 112 Gbps is 28 GHz. Therefore, through frequency domain analysis, for example, analyzing the frequency transmission characteristics of active copper cables, it is shown that: by way of the amplitude control of the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole, and finally, by comparing the input signal 102 and the output signal 106, it is achieved that, the redriver chip 100 is configured for: amplifying in equal proportions a low-frequency part of the output signal 106 relative to a low-frequency part of the input signal 102 and a high-frequency part of the output signal 106 relative to a high-frequency part of the input signal 102. Moreover, the gain control provided by the equalization control module 114 can, with the equalization frequency point that is preset, adapt to the specific data transmission rate, thereby conductive to achieving adaptability under different frequencies, different communication protocols, and, different data transmission rates, so as to improve the overall transmission performance.

Still referring to FIG. 1, the redriver chip 100 compensates for the high-frequency loss while also amplifies the swing amplitude of signal, therefore preventing the received signal swing at the receiver end from being too small, and increasing the eye height in the eye diagram analysis result. Also, the gain of the redriver chip 100 can be greater than 1, for example, it can be 1:1.25, 1:1.5, or 1:2. The redriver chip 100 can be deployed at the transmitter end or the receiver end, or, two of the redriver chips 100 are respectively deployed at the transmitter end and the receiver end. By deploying the redriver chip 100 at the transmitter end, the receiver end, or both ends of the transmission system, the system performance can be improved. Taking the deployment of the redriver chip 100 at the transmitter end as an example, the equivalent output amplitude of the signal sent by the transmitter end is affected by the gain of the redriver chip, a larger gain means a larger equivalent output amplitude of the signal, and, a larger equivalent output amplitude of the signal means that the receiver end receives a larger receiving eye height. For example, when the gain of the redriver chip 100 is 1, the equivalent output amplitude of the signal is 530 millivolts (mV), and the receiving eye height is 7 mV; when the gain is 2, the equivalent output amplitude of the signal is 1060 mV and the receiving eye height is 21 mV. Assuming that the receiver end has a double Continuous Time Linear Equalization (CTLE) gain, the receiving eye height is 21/(7×2)=1.5 times, which means maintaining the CTLE gain of 2 times while also having a higher receiving eye height. Accordingly, by deploying the redriver chip 100 at the transmitter end, a gain greater than 1 can be provided through the redriver chip 100, for example, it can be 1:1.25, 1:1.5, or 1:2, which means that the equivalent output amplitude of the signal sent by the transmitter end is increased. Therefore, it is achieved that compensating for the high-frequency loss while also amplifying the swing amplitude of overall signal, the problem of the small amplitude of the transmitted signal of the DSP chip caused by the de-emphasis processing of the DSP chip can be overcome, and the requirements of the DSP chip at the transmitter end for the linearity of large signals are also effectively reduced, and the power consumption and thermal density of the DSP chip are also reduced, and the heat concentrated around the DSP chip is dispersed to ports to rationalize the system thermal design. Therefore, by using the redriver chip 100 shown in FIG. 1, the signal distortion can be reduced, and the sensitivity of the receiver can be increased, which can help to meet the needs of higher frequency response and achieve better linearity. This is further described below with reference to FIG. 2.

Figure 2:
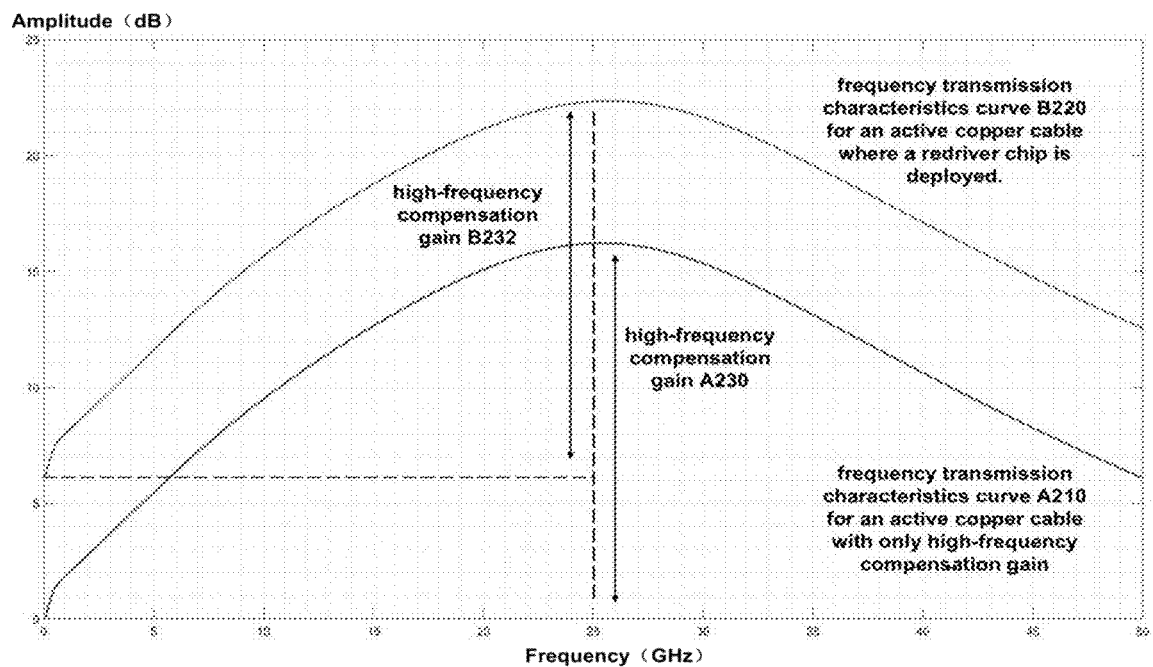
FIG. 2 is a schematic diagram of the frequency transmission characteristics of an active copper cable deployed with the redriver chip of FIG. 1 according to some embodiments.

FIG. 2 is a schematic diagram of the frequency transmission characteristics of an active copper cable deployed with the redriver chip of FIG. 1 according to some embodiments. FIG. 2 shows two frequency transmission characteristics curves, the lower one is the frequency transmission characteristics curve A210 for an active copper cable with only high-frequency compensation gain, and the upper one is the frequency transmission characteristics curve B220 for an active copper cable where a redriver chip is deployed. It can be seen that the lower frequency transmission characteristics curve A210 of the active copper cable with only high-frequency compensation gain corresponds to the case of the active copper cable with only high-frequency compensation gain, and the frequency transmission characteristics curve A210 of the active copper cable with only high-frequency compensation gain shows the amplitude amplification of each frequency component in a wide bandwidth range from 0 GHz to 50 GHz. Among them, the high-frequency compensation gain A230 is provided at the frequency of 25 GHz, that is, only the high-frequency part represented by 25 GHz is compensated, but it can be seen that the amplitude of the output signal is not increased. The upper frequency transmission characteristics curve B220 of the active copper cable with the redriver chip deployed corresponds to the case of the active copper cable where the redriver chip is deployed, taking the redriver chip 100 shown in FIG. 1 as an example. As mentioned above, the redriver chip 100 shown in FIG. 1 is used to compensate for the high-frequency loss while amplifies the swing amplitude of the signal, and the redriver chip 100 is used to amplifying in equal proportions a low-frequency part of the output signal relative to a low-frequency part of the input signal and a high-frequency part of the output signal relative to a high-frequency part of the input signal. FIG. 2 schematically shows that on the frequency transmission characteristics curve B220 of an active copper cable where a redriver chip is deployed (e.g., the redriver chip 100 shown in FIG. 1), uniformly lifting over a wide frequency range is achieved, with each frequency component from 0 GHz to 50 GHz being increased, and the same degree of amplification from low frequency to high frequency, in other words, amplifying in equal proportions from low frequency to high frequency. In addition, on the frequency transmission characteristics curve B220 of an active copper cable with a redriver chip deployed, the high-frequency compensation gain B232 provided at the frequency of 25 GHz, is the same as the high-frequency compensation gain A230 provided at the frequency of 25 GHz, on the frequency transmission characteristics curve A210 of the active copper cable with only high-frequency compensation gain. Also, by comparing the frequency transmission characteristics curve A210 of the active copper cable with only high-frequency compensation gain and the frequency transmission characteristics curve B220 of the active copper cable with the deployment of the redriver chip, it can be seen that, not only the high-frequency gain compensation is performed, but also the amplitude of the whole signal is amplified, and there is a uniform lifting in the entire frequency band. Accordingly, in comparison with the case that there is only high-frequency compensation gain and no amplification of signal amplitude, for example, the frequency transmission characteristics curve A210 of the active copper cable with only high-frequency compensation gain shown in FIG. 2, utilizing the redriver chip 100 of FIG. 1, it is achieved that compensating for the high-frequency loss while also amplifying the swing amplitude of overall signal, additionally, amplifying in equal proportions from low frequency to high frequency, so that there is a larger receiving eye height in the eye diagram analysis result, which means better input signal quality for the receiver end and it is beneficial to improve the performance of the whole system.

Still referring to FIG. 1, utilizing the amplitude control mechanism of the redriver chip 100 shown in FIG. 1, that is, the amplitude control based on the first adjustable gain provided by the amplitude gain control module 112, one may set the degree to which the signal amplitude is lifted automatically or manually. The gain of the redriver chip 100 can be greater than 1, and can be set to 1:1.25, 1:1.5, or 1:2. In addition, the signal amplitude can be controlled adaptively according to the compression of the input signal. For example, after the input signal passes through the forward feedback equalizer of the transmitter end, the signal amplitude is compressed to 0.5 times or other ratios of the original signal, and through adaptive signal amplitude control, such as setting amplitude amplification of 2 times, the amplitude of the output signal is 0.5 multiplied by 2 and is still 1, that is, the receiver end receives the same signal amplitude as the original signal, so that the receiver end is not affected by the equalization setting of the front-end transmitter end, which is conducive to adapting to various situations of pre-stage circuits and post-stage circuits having characteristics of complex and changeable in application scenarios. In addition, the ratio of the output signal to the input signal can be automatically adjusted according to the set ratio. For example, ratios can be set based on cable thickness, cable length, equalization control needs for Alternating Current (AC) to Direct Current (DC), and other considerations, and the amplitude amplification magnification can be adjusted through automated scripts or manual methods to optimize system performance. In addition, the amplitude control mechanism of the redriver chip 100 shown in FIG. 1, that is, the amplitude control based on the first adjustable gain provided by the amplitude gain control module 112, may be combined with the gain control mechanism of the redriver chip 100, that is, the gain control based on the second adjustable gain provided by the equalization control module 114, therefore, having the beneficial results of performing the adaptive signal amplitude control while optimizing the system performance, achieving the adaptability under different frequencies, different communication protocols, and different data transmission rates, and amplifying in equal proportions from the low-frequency part to the high-frequency part, also realizing the uniformly lifting in the system bandwidth, which is ultimately conducive to making the eye diagram analysis results have a larger receiving eye height and improve the overall transmission performance.

In sum, the redriver chip 100 of FIG. 1, compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

Referring to FIG. 1 and FIG. 2, in a manner of implementation, the amplitude gain control module 112, is configured for: performing amplitude control based on the first adjustable gain, to the signal amplitude of the input signal 102, in the first frequency range with reference to the first frequency, so as to obtain the intermediate signal 104 corresponding to the input signal 102. The redriver chip 100 of FIG. 1 implements the signal processing for the input signal 102 in two stages sequentially, the first stage is the amplitude gain control module 112 performs amplitude control based on the first adjustable gain, and, the second stage is the equalization control module 114 performs gain control based on the second adjustable gain. The redriver chip 100 internally includes a signal processing scheme of the two stages that are implemented sequentially, that is, arranging the input signal 102 to first go through the signal processing of the amplitude gain control module 112 and then go through the signal processing of the equalization control module 114, and such a design means that, the amplitude control can be carried out first in order to realize the amplitude amplification in the system bandwidth range, such that this helps to indirectly ensure that the lifting amplitude of all frequency components in the system bandwidth range is consistent, and then the gain control is carried out. By performing equalization control to the gain of the high-frequency part relative to the low-frequency part, it is helpful to achieve amplifying in equal proportions from the low-frequency part to the high-frequency part, and also achieves uniformly lifting in the system bandwidth, which is ultimately conducive to making the eye diagram analysis results have a larger receiving eye height and improving the overall transmission performance. The amplitude control provided by the amplitude gain control module 112 sets a frequency reference point for performing amplitude lifting, and this frequency reference point is used as the starting point to lift up all frequency components in the system bandwidth range, which helps to indirectly ensure that the lifting amplitude of all frequency components in the system bandwidth range is consistent. Here, the amplitude gain control module 112, is configured for: performing amplitude control based on the first adjustable gain, to the signal amplitude of the input signal 102, in the first frequency range with reference to the first frequency. As such, using the first frequency as the reference, uniformly lifting of all frequency components in the first frequency range is realized.

In a manner of implementation, the equalization control module 114, is configured for: performing gain control based on the second adjustable gain, to the gain of the high-frequency part of the intermediate signal 104 relative to the low-frequency part of the intermediate signal 104, in the second frequency range with the second frequency as an equalization frequency point, so as to obtain an output signal corresponding to the input signal. By using the amplitude gain control module 112 and the equalization control module 114 to perform amplitude control and equalization control respectively, this is also conducive to simplifying the overall design complexity, and is conducive to flexibly adapting to the needs of complex application scenarios and the customized needs of users. The amplitude gain control module 112 is designed to provide a signal amplitude lifting within a large bandwidth range, and the amplitude gain control module 112 is used for performing amplitude control based on the first adjustable gain on the signal amplitude of the input signal 102 in the first frequency range with the first frequency as the reference. As such, the amplitude control provided by the amplitude gain control module 112 sets a frequency reference point for performing amplitude lifting, and this frequency reference point is used as the starting point to lift up all frequency components in the system bandwidth range, which helps to indirectly ensure that the lifting amplitude of all frequency components in the system bandwidth range is consistent. Here, the equalization control module 114, is configured for: performing gain control based on the second adjustable gain, to a gain of the high-frequency part of the intermediate signal 104 relative to the low-frequency part of the intermediate signal 104, in the second frequency range with the second frequency as an equalization frequency point. Accordingly, on the basis of the amplitude control provided by the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole. Moreover, the equalization control module 114 can adapt to the specific data transmission rate by the equalization frequency point of the preset high frequency.

In some embodiments, the first frequency range is larger than the second frequency range, and the first frequency is lower than the second frequency. As mentioned above, the amplitude gain control module 112, is configured for: performing amplitude control based on the first adjustable gain, to the signal amplitude of the input signal 102, in the first frequency range with reference to the first frequency; the equalization control module 114, is configured for: performing gain control based on the second adjustable gain, to the gain of the high-frequency part of the intermediate signal 104 relative to the low-frequency part of the intermediate signal 104, in the second frequency range with the second frequency as an equalization frequency point. Here, the first frequency range is larger than the second frequency range, and the first frequency is lower than the second frequency. By way of the amplitude control of the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole, and finally, by comparing the input signal 102 and the output signal 106, it is achieved that, the redriver chip 100 is configured for: amplifying in equal proportions a low-frequency part of the output signal 106 relative to a low-frequency part of the input signal 102 and a high-frequency part of the output signal 106 relative to a high-frequency part of the input signal 102. Moreover, the gain control provided by the equalization control module 114 can, with the equalization frequency point that is preset, adapt to the specific data transmission rate, thereby conductive to achieving adaptability under different frequencies, different communication protocols, and, different data transmission rates, so as to improve the overall transmission performance.

In some embodiments, the second frequency range is from a lower limit of the first frequency range to the second frequency, and the first frequency is close to the lower limit of the first frequency range. As mentioned above, the amplitude gain control module 112, is configured for: performing amplitude control based on the first adjustable gain, to the signal amplitude of the input signal 102, in the first frequency range with reference to the first frequency; the equalization control module 114, is configured for: performing gain control based on the second adjustable gain, to the gain of the high-frequency part of the intermediate signal 104 relative to the low-frequency part of the intermediate signal 104, in the second frequency range with the second frequency as an equalization frequency point. Here, the second frequency range is from a lower limit of the first frequency range to the second frequency, and the first frequency is close to the lower limit of the first frequency range. For example, on the basis of the signal amplitude lifting over a wide range of system bandwidth (from 0 GHz to 50 GHz) provided by the amplitude gain control module 112, the gain control provided by the equalization control module 114, with the equalization frequency point that is preset, such as an equalization frequency point between 26.56 GHz and 28 GHz, can be adapted to a specific data transmission rate (from 100 Gbps to 112 Gbps). The first frequency is close to the lower limit of the first frequency range, this means that, the amplitude gain control module 112 may provide amplitude amplification at lower frequencies close to direct current (DC), so that a lower frequency reference point is set.

In some embodiments, the second frequency is determined based on a data transmission rate associated with the redriver chip. Accordingly, depending on the specific data transmission rate, by presetting the equalization frequency point of high frequency, the gain control provided by the equalization control module 114 can be adapted to the specific data transmission rate, while achieving better performance in the channel frequency response and eye diagram analysis results.

In some embodiments, an upper limit of the second frequency range is not less than the second frequency, an upper limit of the first frequency range is at least twice the upper limit of the second frequency, and the equalization control module 114 is used for providing high-frequency gain compensation in the second frequency range. For example, on the basis of the signal amplitude lifting over a wide range of system bandwidth (from 0 GHz to 50 GHz) provided by the amplitude gain control module 112, the gain control provided by the equalization control module 114, with the equalization frequency point that is preset, such as an equalization frequency point at 25 GHz, can be adapted to a specific data transmission rate. This allows the second frequency range to be from close to 0 GHz to the second frequency, i.e., 25 GHz, which is the equalization frequency point, and the upper limit of the first frequency range, i.e., 50 GHz, is at least twice as high as the upper limit of the second frequency, i.e., 25 GHz. The first frequency range represents the system bandwidth range in which the amplitude gain control module 112 performs amplitude control and signal amplitude lifting, and the upper limit of the first frequency range may be twice or higher than the upper limit of the second frequency range. Therefore, through frequency domain analysis, for example, analyzing the frequency transmission characteristics of active copper cables, it is shown that: by way of the amplitude control of the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole, and finally, by comparing the input signal 102 and the output signal 106, it is achieved that, the redriver chip 100 is configured for: amplifying in equal proportions a low-frequency part of the output signal 106 relative to a low-frequency part of the input signal 102 and a high-frequency part of the output signal 106 relative to a high-frequency part of the input signal 102. Moreover, the gain control provided by the equalization control module 114 can, with the equalization frequency point that is preset, adapt to the specific data transmission rate, thereby conductive to achieving adaptability under different frequencies, different communication protocols, and, different data transmission rates, so as to improve the overall transmission performance.

In some embodiments, the first frequency range is 0 GHz to 50 GHz, the second frequency is a certain frequency between 26.56 GHz and 28 GHz, and the data transmission rate associated with the redriver chip is 100 Gbps to 112 Gbps. Accordingly, on the basis of the amplitude control provided by the amplitude gain control module 112, by providing amplitude amplification in the wide range of system bandwidth, it helps to make the gain control of the equalization control module 114 have higher linearity performance, so that the gain control of the equalization control module 114 for the gain of the high-frequency part relative to the low-frequency part is close to the performance of linear equalization on the whole. Also, by presetting the equalization frequency point of high frequency, the gain control provided by the equalization control module 114 can be adapted to the specific data transmission rate, while achieving better performance in the channel frequency response and eye diagram analysis results.

In a manner of implementation, a ratio of a signal amplitude of the output signal to the signal amplitude of the input signal is fixed, or the signal amplitude of the output signal is fixed. Utilizing the amplitude control mechanism of the redriver chip 100 shown in FIG. 1, that is, the amplitude control based on the first adjustable gain provided by the amplitude gain control module 112, one may set the degree to which the signal amplitude is lifted automatically or manually. According to the set ratio, the ratio of the output signal to the input signal can be kept at the set ratio by automatic adjustment, that is, the ratio of the signal amplitude of the output signal relative to the signal amplitude of the input signal is fixed. As such, ratios can be set based on cable thickness, cable length, equalization control needs for Alternating Current (AC) to Direct Current (DC), and other considerations, and the amplitude amplification magnification can be adjusted through automated scripts or manual methods to optimize system performance. The adaptive signal amplitude control can be carried out according to the compression situation of the input signal, that is, the signal amplitude of the output signal is fixed, for example, the receiver end receives the same signal amplitude as the original signal, so that the receiver end is not affected by the equalization setting of the front-end transmitter end, and is conducive to adapting to various situations of pre-stage circuits and post-stage circuits having characteristics of complex and changeable in application scenarios.

Still referring to FIG. 1, the redriver chip 100 also includes: an output signal detection module 116, configured for detecting a signal amplitude of the output signal 106. The redriver chip 100 is configured to operate in an automatic mode or a manual mode, when the redriver chip 100 operates in the automatic mode, the signal amplitude of the output signal 106 is fixed and independent of the amplitude of the input signal 102, and, when the redriver chip 100 operates in the manual mode, a ratio of the signal amplitude of the output signal 106 to the signal amplitude of the input signal 102 is maintained at a preset value. Utilizing the amplitude control mechanism of the redriver chip 100 shown in FIG. 1, that is, the amplitude control based on the first adjustable gain provided by the amplitude gain control module 112, one may set the degree to which the signal amplitude is lifted automatically or manually. As such, the signal amplitude of the output signal 106 detected in real time by the output signal detection module 116 can be combined, on the basis of the equally proportional amplification from low frequency to high frequency and adjustable gain provided by the above-mentioned redriver chip 100, the signal amplitude of the output signal 106 is set to a fixed value or the ratio of the signal amplitude of the output signal 106 relative to the signal amplitude of the input signal 102 is a preset value, so that it is conducive to adapting to various situations of pre-stage circuits and post-stage circuits having characteristics of complex and changeable in application scenarios. For example, after the input signal passes through the forward feedback equalizer of the transmitter end, the signal amplitude is compressed to 0.5 times or other ratios of the original signal, and through adaptive signal amplitude control, such as setting amplitude amplification of 2 times, the amplitude of the output signal is 0.5 multiplied by 2 and is still 1, that is, the receiver end receives the same signal amplitude as the original signal, so that the receiver end is not affected by the equalization setting of the front-end transmitter end. Therefore, the corresponding mode and configuration can be selected according to the specific purpose of system performance optimization, and the amplitude amplification magnification can be adjusted through automated scripts or manual methods.

In a manner of implementation, the automatic mode is used for measuring an output gain of a pre-stage circuit relative to the redriver chip 100, and the manual mode is used for, dynamically adjusting an output gain of the redriver chip 100, such that the pre-stage circuit and the redriver chip 100 together are, with respect to a post-stage circuit relative to the redriver chip 100, an equivalent circuit having a fixed output gain and a passive cable connection. As mentioned above, when the redriver chip 100 operates in the automatic mode, the signal amplitude of the output signal 106 is fixed and independent of the amplitude of the input signal 102, therefore, utilizing the automatic mode, one may conveniently measure an output gain of a pre-stage circuit. For example, the pre-stage circuit may be A digital signal processing (DSP) chip or a graphics processing unit (GPU), and the output gain of the pre-stage circuit may be 0.5, which means that the input signal is compressed after passing through the pre-stage circuit. As such, by setting to the automatic mode, the redriver chip 100 may, based on the signal amplitude of the input signal 102 detected by the input signal detection module 110, make the signal amplitude of the output signal 106 fixed. As such, changes in the signal amplitude of the input signal 102 can be tracked, and the output gain of the pre-stage circuit can be measured in real time. In addition, when the redriver chip 100 operates in the manual mode, the ratio of the signal amplitude of the output signal 106 relative to the signal amplitude of the input signal 102 is maintained at a preset value. Therefore, on the basis of measuring the output gain of the pre-stage circuit in real time, the corresponding preset value can be set. For example, the output gain of the pre-stage circuit is 0.5, then the preset value can be set to 2, this means that the amplitude of the output signal 106 is 0.5 multiplied by 2 and is still 1, that is, in the view of the post-stage circuit, the output signal 106 has the same signal amplitude as the original signal. In addition, other preset values can be set, for example, the output gain of the pre-stage circuit is 0.5, then the preset value can be set to 4, so that the amplitude of the output signal 106 is 0.5 multiplied by 4 equals 2, that is, in the view of the post-stage circuit, the signal amplitude of the output signal 106 is twice that of the original signal, which is equivalent to having a fixed output gain of 2.0. Accordingly, by using the manual mode to dynamically adjust the output gain of the redriver chip 100, with respect to a post-stage circuit relative to the redriver chip 100, the pre-stage circuit and the redriver chip 100 together are, an equivalent circuit having a fixed output gain and a passive cable connection. In application scenarios such as data centers and artificial intelligence computing platforms, a large number of GPUs need to be applied, assuming that the output gain of the graphics processing unit is 0.5, the redriver chip 100 shown in FIG. 1 can be deployed, and the graphics processing unit can be used as a pre-stage circuit, such that the output gain of the redriver chip 100 through the manual mode can be dynamically adjusted, and the gain of the active cable can be kept at a fixed output gain for the post-stage circuit, such as 1.0, 1.5, 2.0. As such, for the subsequent parts of the GPU that are originally deployed, by deploying the redriver chip 100 and dynamically adjusting the output gain of the redriver chip 100, it is equivalent to the GPU having a fixed output gain and passive cable connection. Accordingly, it is conducive to decoupling the design, simplifying the overall design complexity, and also facilitating the adaptation of other components. Therefore, through the redriver chip 100 with adjustable gain, it can be deployed at the transmitter end, the receiver end or both together, so that it can cooperate with the components that cause the signal swing to be reduced, such as DSP chip or GPU, and the overall cable gain is 1.0 or other fixed output gain, which is conducive to maintaining the signal swing unchanged or increasing the signal swing, and is conducive to adapting to various situations of pre-stage and post-stage circuits having characteristics of complex and changeable in the application scenario. In this way, on the basis of providing high-frequency attenuation compensation for the signal, through the proportional signal amplification from low frequency to high frequency, the signal swing is improved, that is, the equivalent output amplitude of the signal is increased, which can be adapted to other components such as DSP and GPU, and improve the input signal quality and overall system performance of the receiver end in data centers and high-speed data transmission applications.

In some embodiments, the pre-stage circuit is a digital signal processing chip or a graphics processing unit, and the fixed output gain of the equivalent circuit is 1.0. As such, it is conducive to adapting to various situations of pre-stage and post-stage circuits having characteristics of complex and changeable in the application scenarios. It can be used with components such as DSP chips or GPUs that reduce the signal swing to help keep the signal swing constant.

In some embodiments, when the output gain of the pre-stage circuit is 0.5, the output gain of the redriver chip is 2.0. As such, it is conducive to adapting to various situations of pre-stage and post-stage circuits having characteristics of complex and changeable in the application scenarios.

In a manner of implementation, the redriver chip 100 is deployed at a transmitter end or a receiver end, or, two of the redriver chips are respectively deployed at the transmitter end and the receiver end. In some embodiments, a single redriver chip 100 is deployed as a gain driver at the transmitter end or the receiver end. In some embodiments, cascaded deployment (cascaded) may be employed, such as three redriver chips 100 are cascaded at the transmitter end, the receiver end, or both. Here, considering that the cable length is generally no more than 1 meter, if the cable length is more than 1 meter, it may bring a large attenuation, so for cables with a length of more than 1 meter, such as a 2 meters long cable, a greater gain can be provided by cascaded deployment. Two redriver chips are respectively deployed at the transmitter end and the receiver end, so that the two redriver chips thus deployed each have corresponding configurations, thereby adapting to their respective deployment arrangements.

Figure 3:
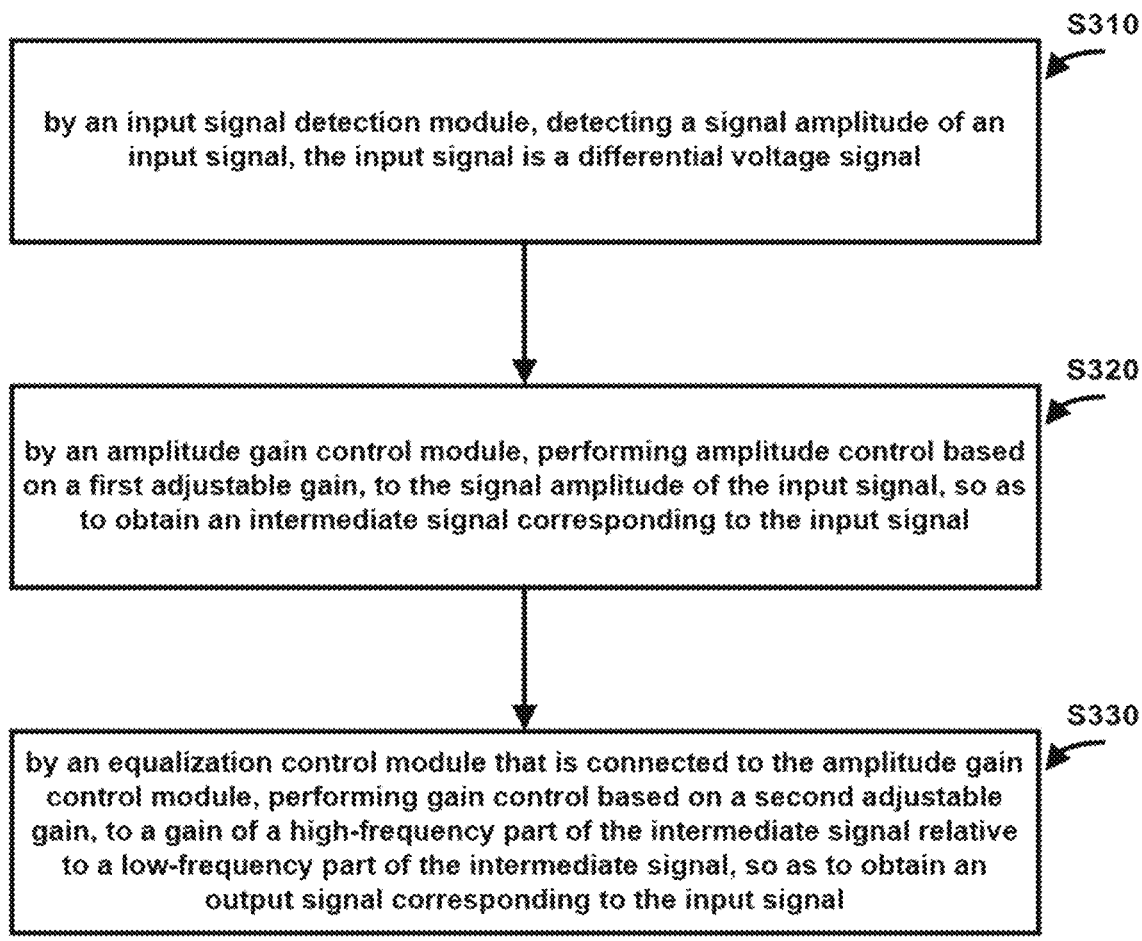
FIG. 3 is a flow diagram of a redriver method for an active copper cable according to some embodiments.

FIG. 3 is a flow diagram of a redriver method for an active copper cable according to some embodiments. As shown in FIG. 3, the redriver method has the following steps.

Step S310: by an input signal detection module, detecting a signal amplitude of an input signal, the input signal is a differential voltage signal.

Step S320: by an amplitude gain control module, performing amplitude control based on a first adjustable gain, to the signal amplitude of the input signal, so as to obtain an intermediate signal corresponding to the input signal.

Step S330: by an equalization control module that is connected to the amplitude gain control module, performing gain control based on a second adjustable gain, to a gain of a high-frequency part of the intermediate signal relative to a low-frequency part of the intermediate signal, so as to obtain an output signal corresponding to the input signal.

Referring to FIG. 3, the redriver chip is configured for: amplifying in equal proportions a low-frequency part of the output signal relative to a low-frequency part of the input signal and a high-frequency part of the output signal relative to a high-frequency part of the input signal. Through frequency domain analysis, for example, analyzing the frequency transmission characteristics of active copper cables, it is shown that: by way of the amplitude control of the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole, and finally, by comparing the input signal and the output signal, it is achieved that, the redriver chip is configured for: amplifying in equal proportions a low-frequency part of the output signal relative to a low-frequency part of the input signal and a high-frequency part of the output signal relative to a high-frequency part of the input signal. Moreover, the gain control provided by the equalization control module can, with the equalization frequency point that is preset, adapt to the specific data transmission rate, thereby conductive to achieving adaptability under different frequencies, different communication protocols, and, different data transmission rates, so as to improve the overall transmission performance. Therefore, the redriver method has the beneficial results of performing the adaptive signal amplitude control while optimizing the system performance, achieving the adaptability under different frequencies, different communication protocols, and different data transmission rates, and amplifying in equal proportions from the low-frequency part to the high-frequency part, also realizing the uniformly lifting in the system bandwidth, which is ultimately conducive to making the eye diagram analysis results have a larger receiving eye height and improve the overall transmission performance.

In sum, the redriver method of FIG. 3 for an active copper cable, compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

In a manner of implementation, the amplitude gain control module, is configured for: performing amplitude control based on the first adjustable gain, to the signal amplitude of the input signal, in the first frequency range with reference to the first frequency, so as to obtain the intermediate signal corresponding to the input signal. In the redriver method of FIG. 3 for an active copper cable, the redriver chip implements the signal processing for the input signal in two stages sequentially, the first stage is the amplitude gain control module performs amplitude control based on the first adjustable gain, and, the second stage is the equalization control module performs gain control based on the second adjustable gain. The redriver chip internally includes a signal processing scheme of the two stages that are implemented sequentially, that is, arranging the input signal to first go through the signal processing of the amplitude gain control module and then go through the signal processing of the equalization control module, and such a design means that, the amplitude control can be carried out first in order to realize the amplitude amplification in the system bandwidth range, such that this helps to indirectly ensure that the lifting amplitude of all frequency components in the system bandwidth range is consistent, and then the gain control is carried out. By performing equalization control to the gain of the high-frequency part relative to the low-frequency part, it is helpful to achieve amplifying in equal proportions from the low-frequency part to the high-frequency part, and also achieves uniformly lifting in the system bandwidth, which is ultimately conducive to making the eye diagram analysis results have a larger receiving eye height and improving the overall transmission performance. The amplitude control provided by the amplitude gain control module sets a frequency reference point for performing amplitude lifting, and this frequency reference point is used as the starting point to lift up all frequency components in the system bandwidth range, which helps to indirectly ensure that the lifting amplitude of all frequency components in the system bandwidth range is consistent. Here, the amplitude gain control module, is configured for: performing amplitude control based on the first adjustable gain, to the signal amplitude of the input signal, in the first frequency range with reference to the first frequency. As such, using the first frequency as the reference, uniformly lifting of all frequency components in the first frequency range is realized.

In a manner of implementation, the equalization control module, is configured for: performing gain control based on the second adjustable gain, to the gain of the high-frequency part of the intermediate signal relative to the low-frequency part of the intermediate signal, in the second frequency range with the second frequency as an equalization frequency point, so as to obtain an output signal corresponding to the input signal. By using the amplitude gain control module and the equalization control module to perform amplitude control and equalization control respectively, this is also conducive to simplifying the overall design complexity, and is conducive to flexibly adapting to the needs of complex application scenarios and the customized needs of users. The amplitude gain control module is designed to provide a signal amplitude lifting within a large bandwidth range, and the amplitude gain control module is used for performing amplitude control based on the first adjustable gain on the signal amplitude of the input signal in the first frequency range with the first frequency as the reference. As such, the amplitude control provided by the amplitude gain control module sets a frequency reference point for performing amplitude lifting, and this frequency reference point is used as the starting point to lift up all frequency components in the system bandwidth range, which helps to indirectly ensure that the lifting amplitude of all frequency components in the system bandwidth range is consistent. Here, the equalization control module, is configured for: performing gain control based on the second adjustable gain, to a gain of the high-frequency part of the intermediate signal relative to the low-frequency part of the intermediate signal, in the second frequency range with the second frequency as an equalization frequency point. Accordingly, on the basis of the amplitude control provided by the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole. Moreover, the equalization control module can adapt to the specific data transmission rate by the equalization frequency point of the preset high frequency.

In some embodiments, the first frequency range is larger than the second frequency range, and the first frequency is lower than the second frequency. As mentioned above, the amplitude gain control module, is configured for: performing amplitude control based on the first adjustable gain, to the signal amplitude of the input signal, in the first frequency range with reference to the first frequency; the equalization control module, is configured for: performing gain control based on the second adjustable gain, to the gain of the high-frequency part of the intermediate signal relative to the low-frequency part of the intermediate signal, in the second frequency range with the second frequency as an equalization frequency point. Here, the first frequency range is larger than the second frequency range, and the first frequency is lower than the second frequency. By way of the amplitude control of the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole, and finally, by comparing the input signal and the output signal, it is achieved that, the redriver chip is configured for: amplifying in equal proportions a low-frequency part of the output signal relative to a low-frequency part of the input signal and a high-frequency part of the output signal relative to a high-frequency part of the input signal. Moreover, the gain control provided by the equalization control module can, with the equalization frequency point that is preset, adapt to the specific data transmission rate, thereby conductive to achieving adaptability under different frequencies, different communication protocols, and, different data transmission rates, so as to improve the overall transmission performance.

In some embodiments, an upper limit of the second frequency range is not less than the second frequency, an upper limit of the first frequency range is at least twice the upper limit of the second frequency, and the equalization control module is used for providing high-frequency gain compensation in the second frequency range. Therefore, through frequency domain analysis, for example, analyzing the frequency transmission characteristics of active copper cables, it is shown that: by way of the amplitude control of the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole, and finally, by comparing the input signal and the output signal, it is achieved that, the redriver chip is configured for: amplifying in equal proportions a low-frequency part of the output signal relative to a low-frequency part of the input signal and a high-frequency part of the output signal relative to a high-frequency part of the input signal. Moreover, the gain control provided by the equalization control module can, with the equalization frequency point that is preset, adapt to the specific data transmission rate, thereby conductive to achieving adaptability under different frequencies, different communication protocols, and, different data transmission rates, so as to improve the overall transmission performance.

Still referring to FIG. 3, the redriver method also includes: by an output signal detection module of the redriver chip, detecting a signal amplitude of the output signal. The redriver chip is configured to operate in an automatic mode or a manual mode, when the redriver chip operates in the automatic mode, the signal amplitude of the output signal is fixed and independent of the amplitude of the input signal, and, when the redriver chip operates in the manual mode, a ratio of the signal amplitude of the output signal to the signal amplitude of the input signal is maintained at a preset value. Utilizing the amplitude control mechanism of the redriver chip, that is, the amplitude control based on the first adjustable gain provided by the amplitude gain control module, one may set the degree to which the signal amplitude is lifted automatically or manually. As such, the signal amplitude of the output signal detected in real time by the output signal detection module can be combined, on the basis of the equally proportional amplification from low frequency to high frequency and adjustable gain provided by the above-mentioned redriver chip, the signal amplitude of the output signal is set to a fixed value or the ratio of the signal amplitude of the output signal relative to the signal amplitude of the input signal is a preset value, so that it is conducive to adapting to various situations of pre-stage circuits and post-stage circuits having characteristics of complex and changeable in application scenarios. For example, after the input signal passes through the forward feedback equalizer of the transmitter end, the signal amplitude is compressed to 0.5 times or other ratios of the original signal, and through adaptive signal amplitude control, such as setting amplitude amplification of 2 times, the amplitude of the output signal is 0.5 multiplied by 2 and is still 1, that is, the receiver end receives the same signal amplitude as the original signal, so that the receiver end is not affected by the equalization setting of the front-end transmitter end. Therefore, the corresponding mode and configuration can be selected according to the specific purpose of system performance optimization, and the amplitude amplification magnification can be adjusted through automated scripts or manual methods.

In a manner of implementation, the automatic mode is used for measuring an output gain of a pre-stage circuit relative to the redriver chip, and the manual mode is used for, dynamically adjusting an output gain of the redriver chip, such that the pre-stage circuit and the redriver chip together are, with respect to a post-stage circuit relative to the redriver chip, an equivalent circuit having a fixed output gain and a passive cable connection. As mentioned above, when the redriver chip operates in the automatic mode, the signal amplitude of the output signal is fixed and independent of the amplitude of the input signal, therefore, utilizing the automatic mode, one may conveniently measure an output gain of a pre-stage circuit. For example, the pre-stage circuit may be A digital signal processing (DSP) chip or a graphics processing unit (GPU), and the output gain of the pre-stage circuit may be 0.5, which means that the input signal is compressed after passing through the pre-stage circuit. As such, by setting to the automatic mode, the redriver chip may, based on the signal amplitude of the input signal detected by the input signal detection module, make the signal amplitude of the output signal fixed. As such, changes in the signal amplitude of the input signal can be tracked, and the output gain of the pre-stage circuit can be measured in real time. In addition, when the redriver chip operates in the manual mode, the ratio of the signal amplitude of the output signal relative to the signal amplitude of the input signal is maintained at a preset value. Therefore, on the basis of measuring the output gain of the pre-stage circuit in real time, the corresponding preset value can be set. For example, the output gain of the pre-stage circuit is 0.5, then the preset value can be set to 2, this means that the amplitude of the output signal is 0.5 multiplied by 2 and is still 1, that is, in the view of the post-stage circuit, the output signal has the same signal amplitude as the original signal. In addition, other preset values can be set, for example, the output gain of the pre-stage circuit is 0.5, then the preset value can be set to 4, so that the amplitude of the output signal is 0.5 multiplied by 4 equals 2, that is, in the view of the post-stage circuit, the signal amplitude of the output signal is twice that of the original signal, which is equivalent to having a fixed output gain of 2.0. Accordingly, by using the manual mode to dynamically adjust the output gain of the redriver chip, with respect to a post-stage circuit relative to the redriver chip, the pre-stage circuit and the redriver chip together are, an equivalent circuit having a fixed output gain and a passive cable connection. In application scenarios such as data centers and artificial intelligence computing platforms, a large number of GPUs need to be applied, assuming that the output gain of the graphics processing unit is 0.5, the redriver chip can be deployed, and the graphics processing unit can be used as a pre-stage circuit, such that the output gain of the redriver chip through the manual mode can be dynamically adjusted, and the gain of the active cable can be kept at a fixed output gain for the post-stage circuit, such as 1.0, 1.5, 2.0. As such, for the subsequent parts of the GPU that are originally deployed, by deploying the redriver chip and dynamically adjusting the output gain of the redriver chip, it is equivalent to the GPU having a fixed output gain and passive cable connection. Accordingly, it is conducive to decoupling the design, simplifying the overall design complexity, and also facilitating the adaptation of other components. Therefore, through the redriver chip with adjustable gain, it can be deployed at the transmitter end, the receiver end or both together, so that it can cooperate with the components that cause the signal swing to be reduced, such as DSP chip or GPU, and the overall cable gain is 1.0 or other fixed output gain, which is conducive to maintaining the signal swing unchanged or increasing the signal swing, and is conducive to adapting to various situations of pre-stage and post-stage circuits having characteristics of complex and changeable in the application scenario. In this way, on the basis of providing high-frequency attenuation compensation for the signal, through the proportional signal amplification from low frequency to high frequency, the signal swing is improved, that is, the equivalent output amplitude of the signal is increased, which can be adapted to other components such as DSP and GPU, and improve the input signal quality and overall system performance of the receiver end in data centers and high-speed data transmission applications.

Figure 4:
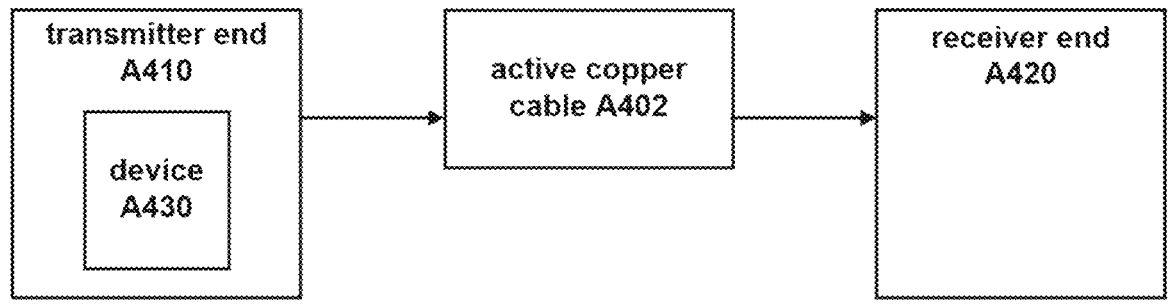
FIG. 4 is a schematic diagram of an active copper cable in the first implementation according to some embodiments.

FIG. 4 is a schematic diagram of an active copper cable in the first implementation according to some embodiments. As shown in FIG. 4, the active copper cable A402 is used to connect the transmitter end A410 and the receiver end A420. The device A430, which is used for active copper cable redriving, is deployed at the transmitter end A410. The device A430 includes: an input signal detection module, configured for detecting a signal amplitude of an input signal, the input signal is a differential voltage signal; an amplitude gain control module, configured for: performing amplitude control based on a first adjustable gain, to the signal amplitude of the input signal, in a first frequency range with reference to a first frequency, so as to obtain an intermediate signal corresponding to the input signal; an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal; an output signal detection module, configured for detecting a signal amplitude of the output signal. The device A430 is configured for: amplifying in equal proportions a low-frequency part of the output signal relative to a low-frequency part of the input signal and a high-frequency part of the output signal relative to a high-frequency part of the input signal.

The device A430 shown in FIG. 4, by affecting the relationship between the input signal and the output signal, compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

Still referring to FIG. 4, in a manner of implementation, the first frequency range is larger than the second frequency range, and the first frequency is lower than the second frequency. The first frequency is close to a lower limit of the first frequency range, the second frequency is determined based on a data transmission rate associated with the device A430. An upper limit of the second frequency range is not less than the second frequency, an upper limit of the first frequency range is at least twice the upper limit of the second frequency, and the equalization control module is used for providing high-frequency gain compensation in the second frequency range. Therefore, through frequency domain analysis, for example, analyzing the frequency transmission characteristics of the active copper cable A402, it is shown that: by way of the amplitude control of the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole, and finally, by comparing the input signal and the output signal, it is achieved that, the device A430 is configured for: amplifying in equal proportions a low-frequency part of the output signal relative to a low-frequency part of the input signal and a high-frequency part of the output signal relative to a high-frequency part of the input signal. Moreover, the gain control provided by the equalization control module can, with the equalization frequency point that is preset, adapt to the specific data transmission rate, thereby conducive to achieving adaptability under different frequencies, different communication protocols, and, different data transmission rates, so as to improve the overall transmission performance.

In a manner of implementation, the device A430 is configured to operate in an automatic mode or a manual mode, when the device A430 operates in the automatic mode, the signal amplitude of the output signal is fixed and independent of the amplitude of the input signal, and, when the device A430 operates in the manual mode, a ratio of the signal amplitude of the output signal to the signal amplitude of the input signal is maintained at a preset value. Utilizing the amplitude control mechanism of the device A430, that is, the amplitude control based on the first adjustable gain provided by the amplitude gain control module, one may set the degree to which the signal amplitude is lifted automatically or manually. As such, the signal amplitude of the output signal detected in real time by the output signal detection module can be combined, on the basis of the equally proportional amplification from low frequency to high frequency and adjustable gain provided by the above-mentioned device A430, the signal amplitude of the output signal is set to a fixed value or the ratio of the signal amplitude of the output signal relative to the signal amplitude of the input signal is a preset value, so that it is conducive to adapting to various situations of pre-stage circuits and post-stage circuits having characteristics of complex and changeable in application scenarios. Therefore, the corresponding mode and configuration can be selected according to the specific purpose of system performance optimization, and the amplitude amplification magnification can be adjusted through automated scripts or manual methods.

In a manner of implementation, the automatic mode is used for measuring an output gain of a pre-stage circuit relative to the device A430, and the manual mode is used for, dynamically adjusting an output gain of the device A430, such that the pre-stage circuit and the device A430 together are, with respect to a post-stage circuit relative to the device A430, an equivalent circuit having a fixed output gain and a passive cable connection. In this way, on the basis of providing high-frequency attenuation compensation for the signal, through the proportional signal amplification from low frequency to high frequency, the signal swing is improved, that is, the equivalent output amplitude of the signal is increased, which can be adapted to other components such as DSP and GPU, and improve the input signal quality and overall system performance of the receiver end in data centers and high-speed data transmission applications.

Figure 5:
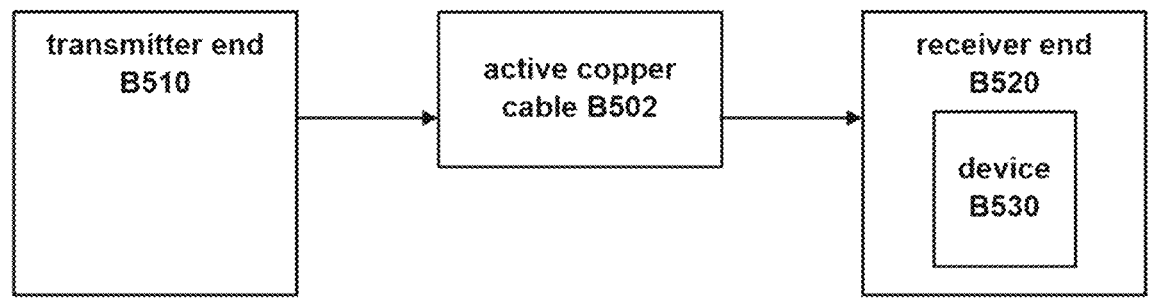
FIG. 5 is a schematic diagram of an active copper cable in the second implementation according to some embodiments.

FIG. 5 is a schematic diagram of an active copper cable in the second implementation according to some embodiments. As shown in FIG. 5, the active copper cable B502 is used to connect the transmitter end B510 and the receiver end B520. The device B530, which is used for active copper cable redriving, is deployed at the receiver end B520. The device B530 includes: an input signal detection module, configured for detecting a signal amplitude of an input signal, the input signal is a differential voltage signal; an amplitude gain control module, configured for: performing amplitude control based on a first adjustable gain, to the signal amplitude of the input signal, in a first frequency range with reference to a first frequency, so as to obtain an intermediate signal corresponding to the input signal; an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal; an output signal detection module, configured for detecting a signal amplitude of the output signal. The device B530 is configured for: amplifying in equal proportions a low-frequency part of the output signal relative to a low-frequency part of the input signal and a high-frequency part of the output signal relative to a high-frequency part of the input signal.

The device B530 shown in FIG. 5, by affecting the relationship between the input signal and the output signal, compensates for the high-frequency loss while also amplifies the swing amplitude of signal, implements amplification from the low-frequency part to the high-frequency part in equal proportions, improves the channel frequency response, achieves a larger receiving eye height in the eye diagram analysis results so as to improve the overall transmission performance, and provides adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

Still referring to FIG. 5, in a manner of implementation, the first frequency range is larger than the second frequency range, and the first frequency is lower than the second frequency. The first frequency is close to a lower limit of the first frequency range, the second frequency is determined based on a data transmission rate associated with the device. An upper limit of the second frequency range is not less than the second frequency, an upper limit of the first frequency range is at least twice the upper limit of the second frequency, and the equalization control module is used for providing high-frequency gain compensation in the second frequency range. Therefore, through frequency domain analysis, for example, analyzing the frequency transmission characteristics of the active copper cable B502, it is shown that: by way of the amplitude control of the amplitude gain control module, by providing amplitude amplification in the wide range of system bandwidth, it helps to make the gain control of the equalization control module have higher linearity performance, so that the gain control of the equalization control module for the gain of the high-frequency part relative to the low-frequency part is close to the performance of linear equalization on the whole, and finally, by comparing the input signal and the output signal, it is achieved that, the device B530 is configured for: amplifying in equal proportions a low-frequency part of the output signal relative to a low-frequency part of the input signal and a high-frequency part of the output signal relative to a high-frequency part of the input signal. Moreover, the gain control provided by the equalization control module can, with the equalization frequency point that is preset, adapt to the specific data transmission rate, thereby conductive to achieving adaptability under different frequencies, different communication protocols, and, different data transmission rates, so as to improve the overall transmission performance.

In a manner of implementation, the device B530 is configured to operate in an automatic mode or a manual mode, when the device B530 operates in the automatic mode, the signal amplitude of the output signal is fixed and independent of the amplitude of the input signal, and, when the device B530 operates in the manual mode, a ratio of the signal amplitude of the output signal to the signal amplitude of the input signal is maintained at a preset value. Utilizing the amplitude control mechanism of the device B530, that is, the amplitude control based on the first adjustable gain provided by the amplitude gain control module, one may set the degree to which the signal amplitude is lifted automatically or manually. As such, the signal amplitude of the output signal detected in real time by the output signal detection module can be combined, on the basis of the equally proportional amplification from low frequency to high frequency and adjustable gain provided by the above-mentioned device B530, the signal amplitude of the output signal is set to a fixed value or the ratio of the signal amplitude of the output signal relative to the signal amplitude of the input signal is a preset value, so that it is conducive to adapting to various situations of pre-stage circuits and post-stage circuits having characteristics of complex and changeable in application scenarios. Therefore, the corresponding mode and configuration can be selected according to the specific purpose of system performance optimization, and the amplitude amplification magnification can be adjusted through automated scripts or manual methods.

In a manner of implementation, the automatic mode is used for measuring an output gain of a pre-stage circuit relative to the device B530, and the manual mode is used for, dynamically adjusting an output gain of the device B530, such that the pre-stage circuit and the device B530 together are, with respect to a post-stage circuit relative to the device B530, an equivalent circuit having a fixed output gain and a passive cable connection. In this way, on the basis of providing high-frequency attenuation compensation for the signal, through the proportional signal amplification from low frequency to high frequency, the signal swing is improved, that is, the equivalent output amplitude of the signal is increased, which can be adapted to other components such as DSP and GPU, and improve the input signal quality and overall system performance of the receiver end in data centers and high-speed data transmission applications.

Figure 6:
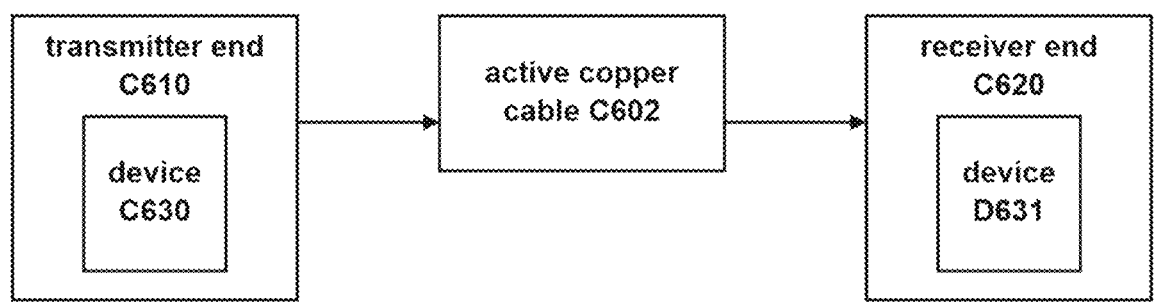
FIG. 6 is a schematic diagram of an active copper cable in the third implementation according to some embodiments.

FIG. 6 is a schematic diagram of an active copper cable in the third implementation according to some embodiments. As shown in FIG. 6, the active copper cable C602 is used to connect the transmitter end C610 and the receiver end C620. Two devices, device C630 and device D631, which are used for active copper cable redriving, are deployed respectively at the transmitter end C610 and the receiver end C620. The device C630 includes: an input signal detection module, configured for detecting a signal amplitude of an input signal, the input signal is a differential voltage signal; an amplitude gain control module, configured for: performing amplitude control based on a first adjustable gain, to the signal amplitude of the input signal, in a first frequency range with reference to a first frequency, so as to obtain an intermediate signal corresponding to the input signal; an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal; an output signal detection module, configured for detecting a signal amplitude of the output signal. The device C630 is configured for: amplifying in equal proportions a low-frequency part of the output signal relative to a low-frequency part of the input signal and a high-frequency part of the output signal relative to a high-frequency part of the input signal. The device D631 has similar structure as the device C630 and will not be repeated here. It should be understood that the device C630 and the device D631 can be configured separately to adapt to their respective deployment arrangements.

The device C630 and the device D631 shown in FIG. 5, by affecting the relationship between the input signal and the output signal, compensate for the high-frequency loss while also amplify the swing amplitude of signal, implement amplification from the low-frequency part to the high-frequency part in equal proportions, improve the channel frequency response, achieve a larger receiving eye height in the eye diagram analysis results so as to improve the overall transmission performance, and provide adaptability under different frequencies, different communication protocols, and, different data transmission rates, which is conducive to adapting to various situations of pre-stage circuits and post-stage circuits having characteristics of complex and changeable in application scenarios, and is conducive to flexibly adapting to the needs of complex application scenarios and the customized needs of users.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array (FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A redriver chip for an active copper cable, comprising:
   an input signal detection module, configured for detecting a signal amplitude of an input signal, wherein the input signal is a differential voltage signal;
   an amplitude gain control module, configured for: performing amplitude control based on a first adjustable gain, to the signal amplitude of the input signal, in a first frequency range with reference to a first frequency, so as to obtain an intermediate signal corresponding to the input signal;
   an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency,
   wherein the redriver chip is configured for: amplifying in equal proportions a low-frequency part of the output signal relative to a low-frequency part of the input signal and a high-frequency part of the output signal relative to a high-frequency part of the input signal.

2. The redriver chip according to claim 1, the second frequency range is from a lower limit of the first frequency range to the second frequency, and the first frequency is close to the lower limit of the first frequency range.

3. The redriver chip according to claim 1, the second frequency is determined based on a data transmission rate associated with the redriver chip.

4. The redriver chip according to claim 1, an upper limit of the second frequency range is not less than the second frequency, an upper limit of the first frequency range is at least twice the upper limit of the second frequency, and the equalization control module is used for providing high-frequency gain compensation in the second frequency range.

5. The redriver chip according to claim 1, the first frequency range is 0 GHz to 50 GHz, the second frequency is a certain frequency between 26.56 GHz and 28 GHz, and the data transmission rate associated with the redriver chip is 100 Gbps to 112 Gbps.

6. The redriver chip according to claim 1, a ratio of a signal amplitude of the output signal to the signal amplitude of the input signal is fixed, or the signal amplitude of the output signal is fixed.

7. The redriver chip according to claim 1, further comprising:
   an output signal detection module, configured for detecting a signal amplitude of the output signal,
   wherein the redriver chip is configured to operate in an automatic mode or a manual mode, when the redriver chip operates in the automatic mode, the signal amplitude of the output signal is fixed and independent of the amplitude of the input signal, and, when the redriver chip operates in the manual mode, a ratio of the signal amplitude of the output signal to the signal amplitude of the input signal is maintained at a preset value.

8. The redriver chip according to claim 7, the automatic mode is used for measuring an output gain of a pre-stage circuit relative to the redriver chip, and the manual mode is used for, dynamically adjusting an output gain of the redriver chip, such that the pre-stage circuit and the redriver chip together are, with respect to a post-stage circuit relative to the redriver chip, an equivalent circuit having a fixed output gain and a passive cable connection.

9. The redriver chip according to claim 8, the pre-stage circuit is a digital signal processing chip or a graphics processing unit, and the fixed output gain of the equivalent circuit is 1.0.

10. The redriver chip of claim 9, when the output gain of the pre-stage circuit is 0.5, the output gain of the redriver chip is 2.0.

11. The redriver chip according to claim 1, the redriver chip is deployed at a transmitter end or a receiver end, or, two of the redriver chips are respectively deployed at the transmitter end and the receiver end.

12. A redriver method for an active copper cable, comprising:
   by an input signal detection module of a redriver chip, detecting a signal amplitude of an input signal, wherein the input signal is a differential voltage signal;
   by an amplitude gain control module of the redriver chip, performing amplitude control based on a first adjustable gain, to the signal amplitude of the input signal, in a first frequency range with reference to a first frequency, so as to obtain an intermediate signal corresponding to the input signal;
   by an equalization control module of the redriver chip that is connected to the amplitude gain control module, performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency;
   wherein the redriver chip is configured for: amplifying in equal proportions a low-frequency part of the output signal relative to a low-frequency part of the input signal and a high-frequency part of the output signal relative to a high-frequency part of the input signal.

13. The redriver method according to claim 12, an upper limit of the second frequency range is not less than the second frequency, an upper limit of the first frequency range is at least twice the upper limit of the second frequency, and the equalization control module is used for providing high-frequency gain compensation in the second frequency range.

14. The redriver method according to claim 12, further comprising:
   by an output signal detection module of the redriver chip, detecting a signal amplitude of the output signal,
   wherein the redriver chip is configured to operate in an automatic mode or a manual mode, when the redriver chip operates in the automatic mode, the signal amplitude of the output signal is fixed and independent of the amplitude of the input signal, and, when the redriver chip operates in the manual mode, a ratio of the signal amplitude of the output signal to the signal amplitude of the input signal is maintained at a preset value.

15. The redriver method according to claim 14, the automatic mode is used for measuring an output gain of a pre-stage circuit relative to the redriver chip, and the manual mode is used for, dynamically adjusting an output gain of the redriver chip, such that the pre-stage circuit and the redriver chip together are, with respect to a post-stage circuit relative to the redriver chip, an equivalent circuit having a fixed output gain and a passive cable connection.

16. A device, for active copper cable redriving, the device comprising:
  an input signal detection module, configured for detecting a signal amplitude of an input signal, wherein the input signal is a differential voltage signal;
  an amplitude gain control module, configured for: performing amplitude control based on a first adjustable gain, to the signal amplitude of the input signal, in a first frequency range with reference to a first frequency, so as to obtain an intermediate signal corresponding to the input signal;
  an equalization control module, connected to the amplitude gain control module, configured for: performing gain control based on a second adjustable gain, to a gain of a high-frequency part of the intermediate signal relative to a low-frequency part of the intermediate signal, in a second frequency range with a second frequency as an equalization frequency point, so as to obtain an output signal corresponding to the input signal, wherein the first frequency range is larger than the second frequency range, and the first frequency is lower than the second frequency;
  an output signal detection module, configured for detecting a signal amplitude of the output signal,
  wherein the device is configured for: amplifying in equal proportions a low-frequency part of the output signal relative to a low-frequency part of the input signal and a high-frequency part of the output signal relative to a high-frequency part of the input signal.

17. The device according to claim 16, the first frequency is close to a lower limit of the first frequency range, the second frequency is determined based on a data transmission rate associated with the device, an upper limit of the second frequency range is not less than the second frequency, an upper limit of the first frequency range is at least twice the upper limit of the second frequency, and the equalization control module is used for providing high-frequency gain compensation in the second frequency range.

18. The device according to claim 16, the device is configured to operate in an automatic mode or a manual mode, when the device operates in the automatic mode, the signal amplitude of the output signal is fixed and independent of the amplitude of the input signal, and, when the device operates in the manual mode, a ratio of the signal amplitude of the output signal to the signal amplitude of the input signal is maintained at a preset value.

19. The device according to claim 18, the automatic mode is used for measuring an output gain of a pre-stage circuit relative to the device, and the manual mode is used for, dynamically adjusting an output gain of the device, such that the pre-stage circuit and the device together are, with respect to a post-stage circuit relative to the device, an equivalent circuit having a fixed output gain and a passive cable connection.

20. The device according to claim 18, the device is deployed at a transmitter end or a receiver end, or, two of the devices are respectively deployed at the transmitter end and the receiver end.

* * * * *